(12) United States Patent
Hayaishi (10) Patent No.: US 7,746,392 B2
(45) Date of Patent: Jun. 29, 2010

(54) IMAGE DATA PROCESSING TECHNIQUE FOR IMAGES TAKEN BY IMAGING UNIT

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 856 days.

(21) Appl. No.: 11/148,696

(22) Filed: Jun. 8, 2005

(65) Prior Publication Data

US 2005/0286797 A1 Dec. 29, 2005

(30) Foreign Application Priority Data

Jun. 9, 2004 (JP) .............................. 2004-171266

(51) Int. Cl.
*H04N 9/64* (2006.01)
(52) U.S. Cl. ...................... 348/246; 348/241; 348/247; 382/275
(58) Field of Classification Search .................. 348/246
See application file for complete search history.

(56) References Cited

U.S. PATENT DOCUMENTS

| | | | |
|---|---|---|---|
| 5,995,675 A | | 11/1999 | Hwang |
| 6,381,357 B1 * | | 4/2002 | Tan et al. ..................... 382/141 |
| 7,009,644 B1 * | | 3/2006 | Sanchez et al. ............. 348/247 |
| 7,092,018 B1 | | 8/2006 | Watanabe |
| 7,283,165 B2 * | | 10/2007 | Alderson et al. ............ 348/246 |
| 2002/0122123 A1 * | | 9/2002 | Kimura ....................... 348/246 |
| 2004/0032516 A1 * | | 2/2004 | Kakarala ..................... 348/246 |
| 2004/0051798 A1 * | | 3/2004 | Kakarala et al. ............ 348/246 |
| 2004/0208395 A1 * | | 10/2004 | Nomura ....................... 382/275 |
| 2006/0232691 A1 | | 10/2006 | Watanabe |
| 2006/0233431 A1 | | 10/2006 | Watanabe |

FOREIGN PATENT DOCUMENTS

| | | |
|---|---|---|
| JP | 05-268531 | 10/1993 |
| JP | 09-046601 | 2/1997 |
| JP | 10-051693 | 2/1998 |
| JP | 10-198802 | 7/1998 |

(Continued)

OTHER PUBLICATIONS

Abstract of Japanese Patent Publication No. 05-268531, Pub. Date: Oct. 15, 1993, Patent Abstracts of Japan.

(Continued)

*Primary Examiner*—Sinh Tran
*Assistant Examiner*—Paul Berardesca
(74) *Attorney, Agent, or Firm*—Martine Penilla & Gencarella, LLP (57) ABSTRACT

The technique of the invention accurately detects a pixel defect in an image taken by an imaging device, such as a digital still camera. The image processing flow of the invention maps luminance data to respective pixels of a specified pixel array and computes a difference between the luminance data of each target pixel and an average value of the luminance data of four adjoining pixels on the top, bottom, left, and right of the target pixel. The presence or the absence of any pixel defect is detected according to the computed difference. The luminance data of an identified defective pixel detected as the pixel defect is corrected with the luminance data of adjoining pixels on the top, bottom, left, and right of the identified defective pixel.

6 Claims, 6 Drawing Sheets

FOREIGN PATENT DOCUMENTS

| JP | 2001-197372 | 7/2001 |
|----|-------------|--------|
| JP | 2002-176653 | 6/2002 |
| JP | 2002-197450 | 7/2002 |
| JP | 2004-015191 | 1/2004 |
| JP | 2004-023683 | 1/2004 |

OTHER PUBLICATIONS

Abstract of Japanese Patent Publication No. 10-198802, Pub. Date: Jul. 31, 1998, Patent Abstracts of Japan.
Abstract of Japanese Patent Publication No. 09-046601, Pub. Date: Feb. 14, 1997, Patent Abstracts of Japan.
Abstract of Japanese Patent Publication No. 2001-197372, Pub. Date: Jul. 19, 2001, Patent Abstracts of Japan.
Abstract of Japanese Patent Publication No. 2002-176653, Pub. Date: Jun. 21, 2002, Patent Abstracts of Japan.
Abstract of Japanese Patent Publication No. 2004-023683 Pub. Date: Jan. 22, 2004, Patent Abstracts of Japan.
Abstract of Japanese Patent Publication No. 10-051693, Pub. Date: Feb. 20, 1998, Patent Abstracts of Japan.
Abstract of Japanese Patent Publication No. 2002-197450, Pub. Date: Jul. 12, 2002, Patent Abstracts of Japan.
Abstract of Japanese Patent Publication No. 2004-015191, Pub. Date: Jan. 15, 2004, Patent Abstracts of Japan.

* cited by examiner

IMAGE DATA PROCESSING TECHNIQUE FOR IMAGES TAKEN BY IMAGING UNIT

CLAIM OF PRIORITY

The present application claims priority from Japanese Application P2004-171266 filed on Jun. 9, 2004, the content of which is hereby incorporated by reference into this application.

BACKGROUND OF THE INVENTION

1. Field of the Invention

The present invention relates to an image data processing technique to process input image data of images taken by imaging unit.

2. Description of the Related Art

With the rapid development and spread of digital still cameras, images are readily available in the form of digital data. There is a proposed technique of automatically adjusting the contrast in displayed or printed images (see, for example, Patent Document 1: Japanese Patent Laid-Open Gazette No. 10-198802).

Another proposed technique is applied to an imaging device having three CCDs (charge coupled devices) provided corresponding to three primary colors to detect a defect of each CCD (see, for example, Patent Document 2: Japanese Patent Laid-Open Gazette No. 5-268531).

A recently advanced digital still camera has CCDs corresponding to respective pixels and allocates one of three primary color filters of red, green, and blue to each CCD. The CCD at each pixel outputs one color signal corresponding to the allocated color filter. The technique disclosed in Patent Document 2, on the other hand, detects a defect of each of the three CCDs provided corresponding to the three primary colors. Because of the essential structural difference from the digital still camera having CCDs corresponding to the respective pixels, the defect detection technique for detecting a pixel defect of this digital still camera is different from the defect detection technique for defecting the detect of each of the three CCDs provided corresponding to the three primary colors.

SUMMARY OF THE INVENTION

The object of the invention is thus to accurately detect a pixel defect in an image taken by an imaging device, such as a digital still camera.

At least part of the above and the other related objects is attained by an image processing device of the invention. In the image processing device of the invention, an image data input module receives the input image data as unprocessed raw data and as a set of pixel data, which include luminance data representing luminance values of respective pixels constituting the imaging unit. A mapping module maps the input pixel data to an array of the respective pixels constituting the imaging unit. The luminance data are accordingly arranged corresponding to the specified array of the pixels.

A pixel defect detection module compares the luminance data of each target pixel as an object of detection with the luminance data of at least one adjoining pixel adjacent to the target pixel and detects a pixel defect according to a result of the comparison. A pixel defect correction and update module corrects the luminance data of an identified defective pixel, which is detected as the pixel defect by the pixel defect detection module, with the luminance data of at least one adjoining pixel adjacent to the identified defective pixel and updates the luminance data of the pixel data allocated to the defective pixel by the mapping module to the corrected luminance data. The luminance data arranged corresponding to the specified array of the pixels accordingly excludes the luminance data of the identified defective pixel but includes the corrected luminance data of the defective pixel with the luminance data of the at least one adjoining pixel. This desirably eliminates or at least reduces the adverse effects of the defective pixel from the image data as the set of pixel data including the luminance data. The resulting image data is favorably used for subsequent image processing.

In one preferable embodiment of the image processing device of the invention, the pixel defect detection module computes a difference between the luminance data of each target pixel and an average value of the luminance data of multiple adjoining pixels adjacent to the target pixel and identifies the target pixel as a defective pixel when the difference exceeds a preset reference value. The pixel defect correction and update module replaces the luminance data of the identified defective pixel with the average value of the luminance data of the adjoining pixels and updates the luminance data allocated to the defective pixel by the mapping module to the replaced average value of the luminance data. Such correction of the luminance data of the defective pixel with the luminance data of the adjoining pixels desirably relieves the user's impression of strangeness due to a significant change of the luminance data around the defective pixel.

The pixel defect detection module may compare the luminance data by taking into account effects of transmission factors of filters allocated to the respective pixels constituting the imaging unit.

Each filter has a specified color and transmits light of the specified color. The different colors of the filters give a variation in luminance data. This arrangement enables the comparison of the luminance data after elimination or at least reduction of the effects of the filters, thus ensuring the accurate detection of a pixel defect and the reliable correction of the detected pixel defect.

Another preferable embodiment of the image processing device stores a position of the identified defective pixel in the array of the pixels constituting the imaging unit. In response to input of another image data from the imaging unit after storage of the position of the defective pixel, the image processing device automatically corrects the luminance data of a certain pixel at the stored position of the defective pixel with the luminance data of at least one adjoining pixel adjacent to the certain pixel and updates the luminance data of the certain pixel to the corrected luminance data.

Only replacement or fixation of the imaging unit eliminates the pixel defect. This arrangement does not require identification of a defective pixel at the same position in every input of image data and thus desirably simplifies the image processing.

The image processing device of this embodiment may be designed to edit the image data including the updated luminance data of the identified defective pixel, generate edited image data, and output the edited image data. This arrangement desirably relieves the user's impression of strangeness on the luminance in a resulting edited image.

The image data processing technique of the invention is actualized by diversity of applications other than the image processing device, for example, a corresponding image data processing method, computer programs that cause a computer to attain the functions of the image processing device or the corresponding image data processing method, and recording media that stores such computer programs.

DESCRIPTION OF THE PREFERRED EMBODIMENTS

In order to clarify the features, aspects, and effects of the invention, one mode of carrying out the invention is described below as a preferred embodiment in the following sequence:

A. Embodiment
  A1. Configuration of Image Processing System
  A2. Image Processing

A. Embodiment

A1. Configuration of Image Processing System

Figure 1:
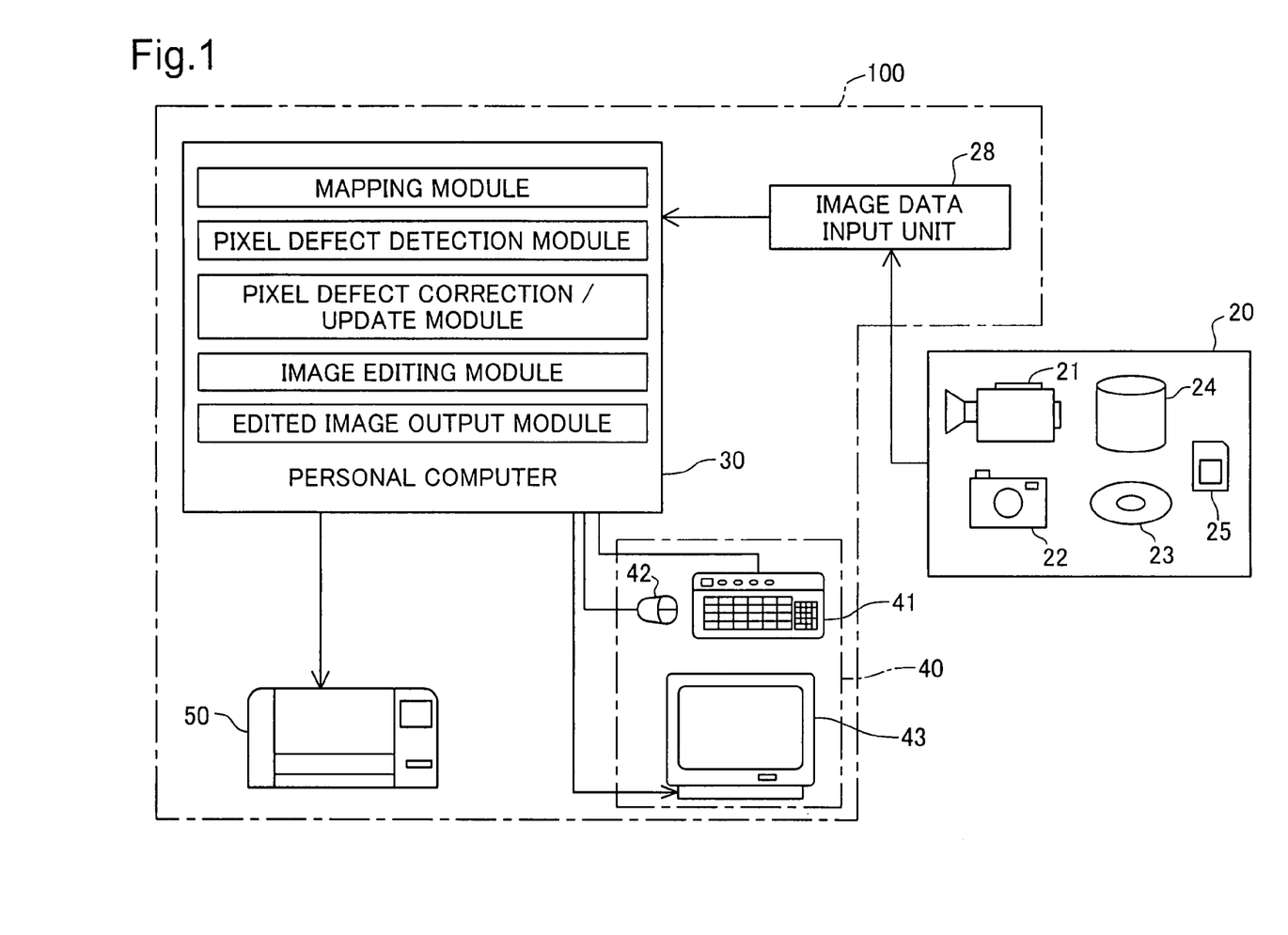
FIG. 1 schematically illustrates the configuration of an image processing system in one embodiment of the invention.

FIG. 1 schematically illustrates the configuration of an image processing system 100 in one embodiment of the invention. As illustrated, the image processing system 100 includes a personal computer 30 as a primary device, user interfaces 40 operated by the user to instruct a required series of image processing, and a color printer 50 used to output processed images. An image data input unit 28 inputs image data from an image database 20, which supplies various image data representing moving images and still images, and transfers the input image data to the personal computer 30. The personal computer 30 stores the input image data into non-illustrated memory units, such as internal memories and a hard disk.

The image database 20 includes various imaging devices, such as a digital video camera 21 and a digital still camera 22, and diverse image data storage units, such as a DVD 23, a hard disk 24, and a memory card 25, and supplies image data to the personal computer 30. The DVD 23, the hard disk 24, and the memory card 25 store the image data as unprocessed raw data corresponding to images taken by the imaging device, for example, the digital still camera 22. The unprocessed raw data include substantial image data representing each image and pixel array data representing a pixel arrangement or an array of pixels in the image expressed as, for example, x columns and y rows. The pixel array data, as well as the substantial image data are input into the personal computer 30.

The personal computer 30 is designed to output results of image editing to the color printer 50 and a display 43 of the user interfaces 40, as discussed later.

The personal computer 30 includes a CPU, a ROM, a RAM, and a hard disk with image processing software installed therein, although these constituents are not specifically illustrated. These constituents cooperatively exert required functions for image processing, that is, a mapping module, a pixel defect detection module, a pixel defect correction/update module, an image editing module, and an edited image output module. The personal computer 30 receives and sends data from and to the external devices, such as the image data input unit 28, the display 43, and the color printer 50, via non-illustrated I/F circuits. The image processing software installed in the hard disk detects a pixel defect in each image input by the image data input unit 28, corrects the pixel defect, and generates an edited image in response to the user's instructions. The details of this image processing flow will be described below. The image data input unit 28 may be incorporated in the personal computer 30.

A2. Image Processing

Figure 2:
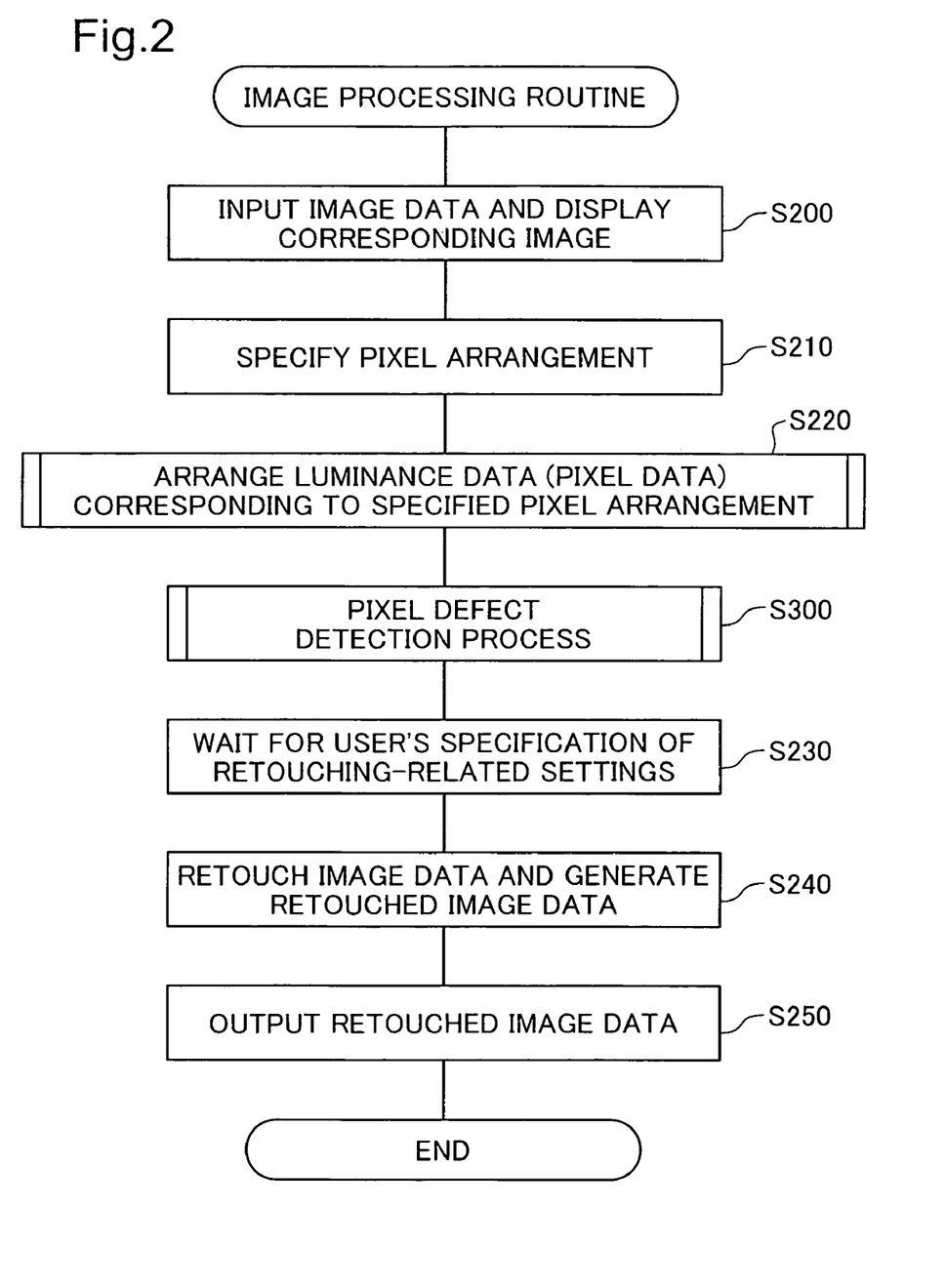
FIG. 2 is a flowchart showing an image processing routine to detect a pixel defect in each image input by an image data input unit of the image processing system, correct the pixel defect, and generate an edited image in response to the user's instructions.

FIG. 2 is a flowchart showing an image processing routine to detect a pixel defect in each image input by the image data input unit 28, correct the pixel defect, and generate an edited image in response to the user's instructions.

The image processing routine of FIG. 2 (image data processing) is triggered by the user's predetermined operation, for example, the user's operation of some switches (not shown) or the user's key operation of a keyboard 41 included in the user interfaces 40 in the image processing system 100 having the hardware configuration discussed above. The image processing routine may be executed in response to the user's click of an image processing start icon on the screen of the display 43 with a mouse 42 as one of the user interfaces 40.

In the image processing routine of FIG. 2, the personal computer 30 first inputs image data from the image database 20, for example, the digital still camera 22 or the memory card 25, via the image data input unit 28 and shows an image corresponding to the input image data on the display 43 (step S200). The input image data is unprocessed raw data and a set of pixel data including luminance data, which represent luminance values of the respective pixels corresponding to CCD cameras of the digital still camera 22. The pixel is equivalent to a light-sensitive element of CCD.

When simultaneous input of image data representing multiple images is allowed, a list of the input images may be displayed as thumbnail images, for example, in a right-half display area on the display 43. The simultaneously input multiple images may otherwise be displayed sequentially on the display 43. The user selects an object image to be edited among the displayed multiple images through the keyboard operation and the mouse operation. The personal computer 30 waits for the user's selection of the object image. In the case of input of image data representing only one image, however, the personal computer 30 does not wait for the user's operation but immediately displays the input image on the display 43 at step S200.

The user may select object image data out of a list of the names of image data, instead of the displayed images.

The personal computer 30 subsequently specifies a pixel arrangement or an array of pixels constituting the selected object image (for example, a dot matrix of pixels) (step S210). The specification may depend upon, for example, the user's entry of the model name of the digital still camera 22 connected to the image data input unit 28, input of information on the model name from the digital still camera 22, or input of pixel array data (representing the pixel arrangement or the array of pixels) included in the image data stored in the memory card 25. The array of pixels is specified at step S210, for example, as a dot matrix of x columns and y rows.

Figure 3:
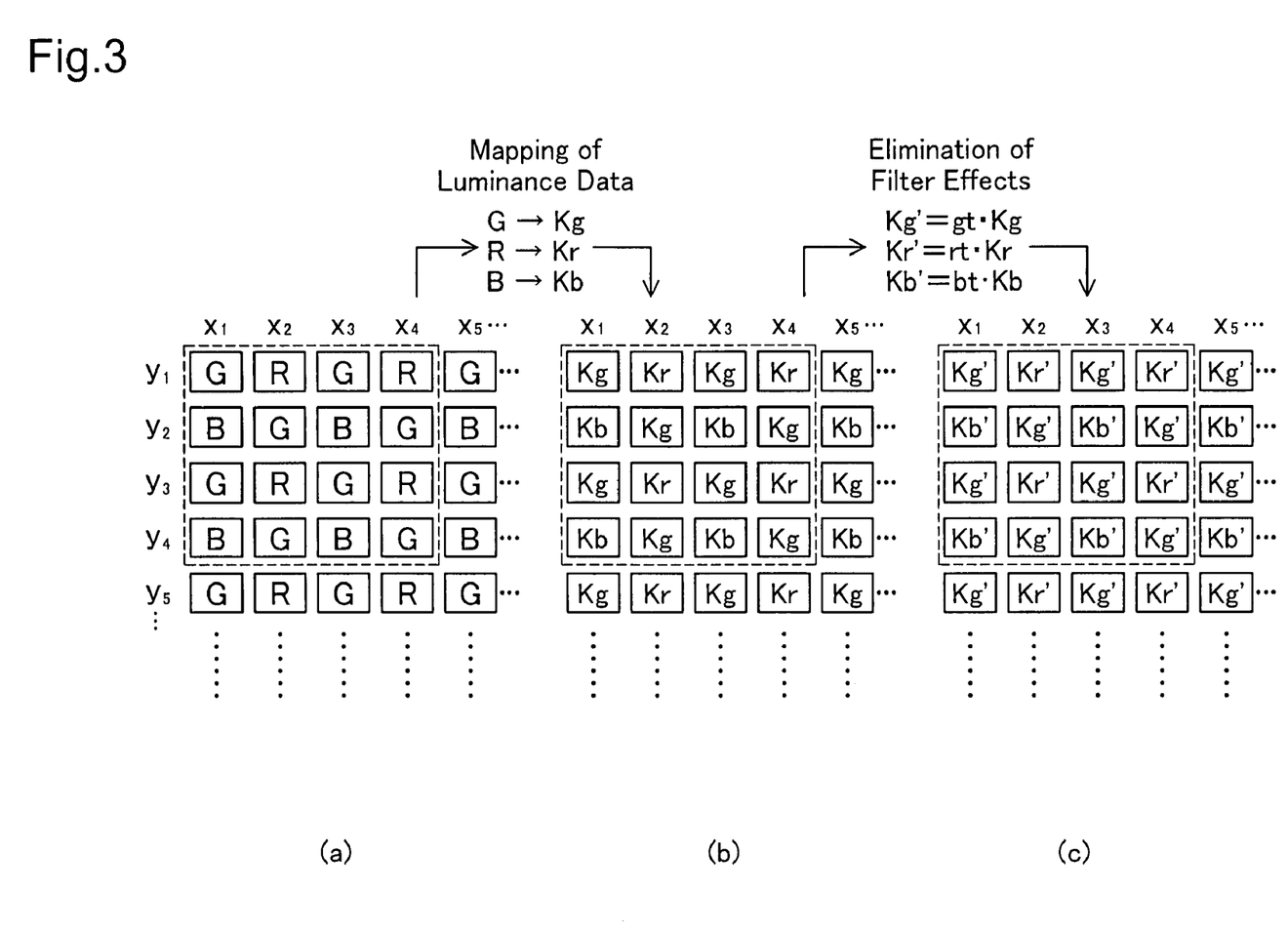
FIG. 3 shows a mapping of luminance data included in input image data to an array of pixels.

The personal computer 30 then arranges the luminance data of the respective pixels corresponding to the specified array of pixels (step S220). FIG. 3 shows a mapping of luminance data included in input image data to an array of pixels. In the illustrated example of FIG. 3, selected filters are allocated to the respective pixels. Pixels of four columns and four rows are set to one unit, and red (R), green (G), and blue (B) filters (three primary color filters) are allocated to the respective pixels in a preset sequence. The filter arrangement is not restricted to the illustrated arrangement of the primary color filters, but depends upon the structure of the digital still camera 22. The filter arrangement may include complementary color filters of cyan, magenta, yellow, and green, in addition to or in place of the three primary color filters.

At step S220 in the flowchart of FIG. 2, the personal computer 30 arranges the luminance data of the respective pixels corresponding to the array of the pixels with the selected filters shown in FIG. 3(a). Luminance data Kr, Kg, and Kb are respectively mapped to the pixels with the R filter, the pixels with the G filter, and the pixels with the B filter. This gives an array of the luminance data Kr, Kg, and Kb arranged corresponding to the filter arrangement as shown in FIG. 3(b).

The luminance data Kr, Kg, and Kb are obtained by transmission through the primary color filters allocated to the respective pixels. The luminance data Kr, Kg, and Kb are accordingly multiplied by transmission factors rt, gt, and bt of the respective primary color filters R, G, and B to give processed luminance data Kr', Kg', and Kb' as shown in FIG. 3(c):

$$Kr'=rt \cdot Kr$$

$$Kg'=gt \cdot Kg$$

$$Kb'=bt \cdot Kb$$

The processed luminance data Kr', Kg', and Kb' eliminate the effects of the three primary color filters allocated to the respective pixels.

After the arrangement of the luminance data, the personal computer 30 detects any pixel defect in the object image (step S300). The pixel defect detection process detects any pixel defect in the array of luminance data arranged corresponding to the pixel array as shown in FIG. 3 and corrects the luminance data of a defective pixel in the detected pixel defect. The details of the pixel defect detection process will be described later.

After the pixel defect detection process, the personal computer 30 waits for the user's specification of editing (retouching) (step S230). The user may operate the keyboard 41 and the mouse 42 to specify the required settings for editing, for example, contrast to adjust the lightness of the image, tone correction to specify the tone of the image, sharpness to adjust the sharpness of the image, and white balance. The user may specify the editing-related settings, for example, the contrast, the tone correction, the sharpness, and the white balance, to be regulated automatically by the personal computer 30. These editing-related settings may be regulated according to the characteristics of the image, for example, the type of image as a landscape or a portrait. The optimum value of the sharpness depends upon the output size of the resulting printed image. The sharpness may thus be automatically regulated according to the output side. A smoothing process is another editing-related setting in the portrait image to remove the noises with a preference to the expression of the beautiful skin color.

The personal computer 30 edits the object image data based on the user's specification of the editing-related settings (retouching) and generates edited image data (retouched image data) (step S240). The edited image data (retouched image data) is output to the color printer 50 (step S250). The color printer 50 prints and outputs an edited image corresponding to the input edited image data.

Figure 4:
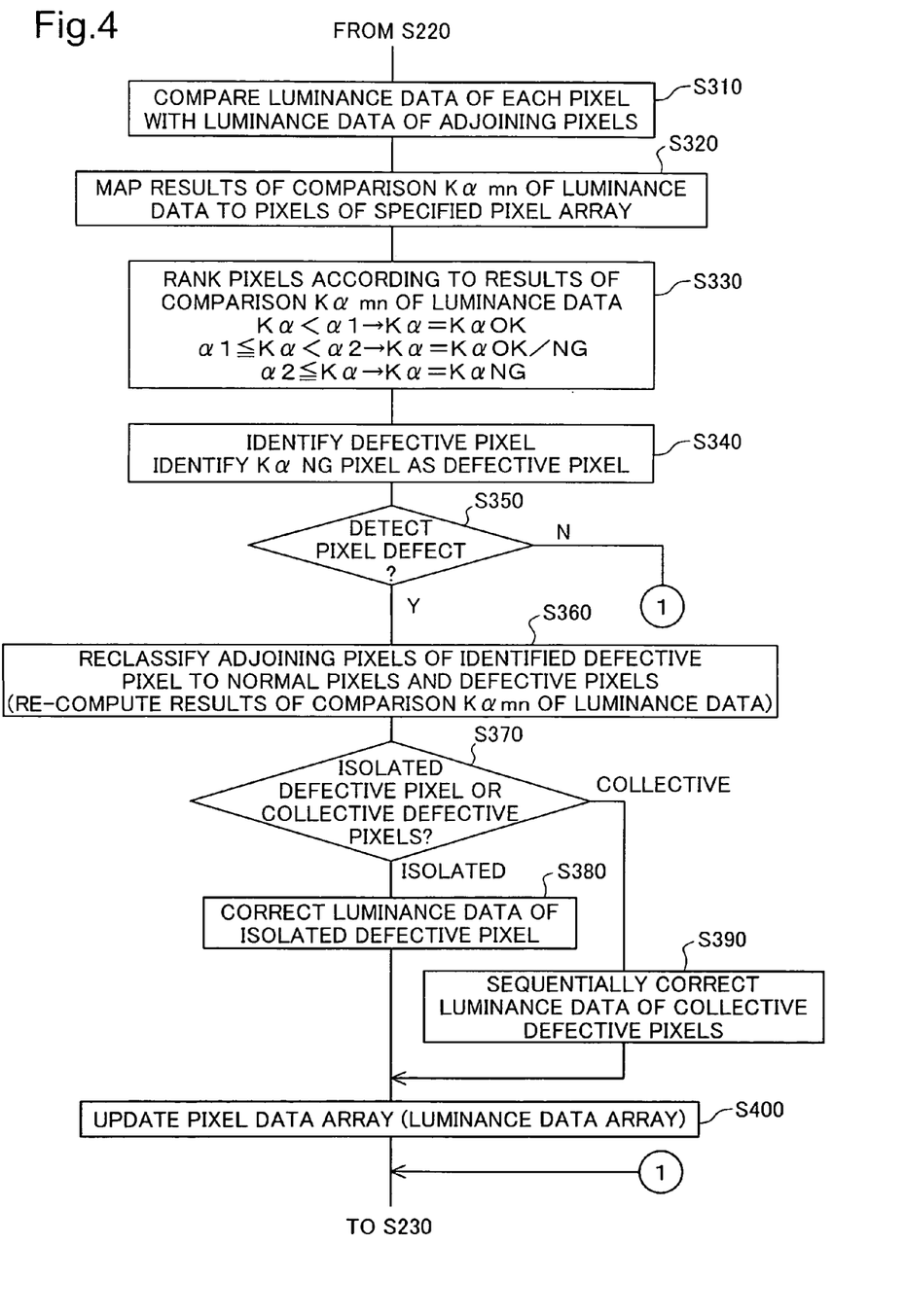
FIG. 4 is a flowchart showing the details of the pixel defect detection process in the image processing routine of FIG. 2.
Figure 5:
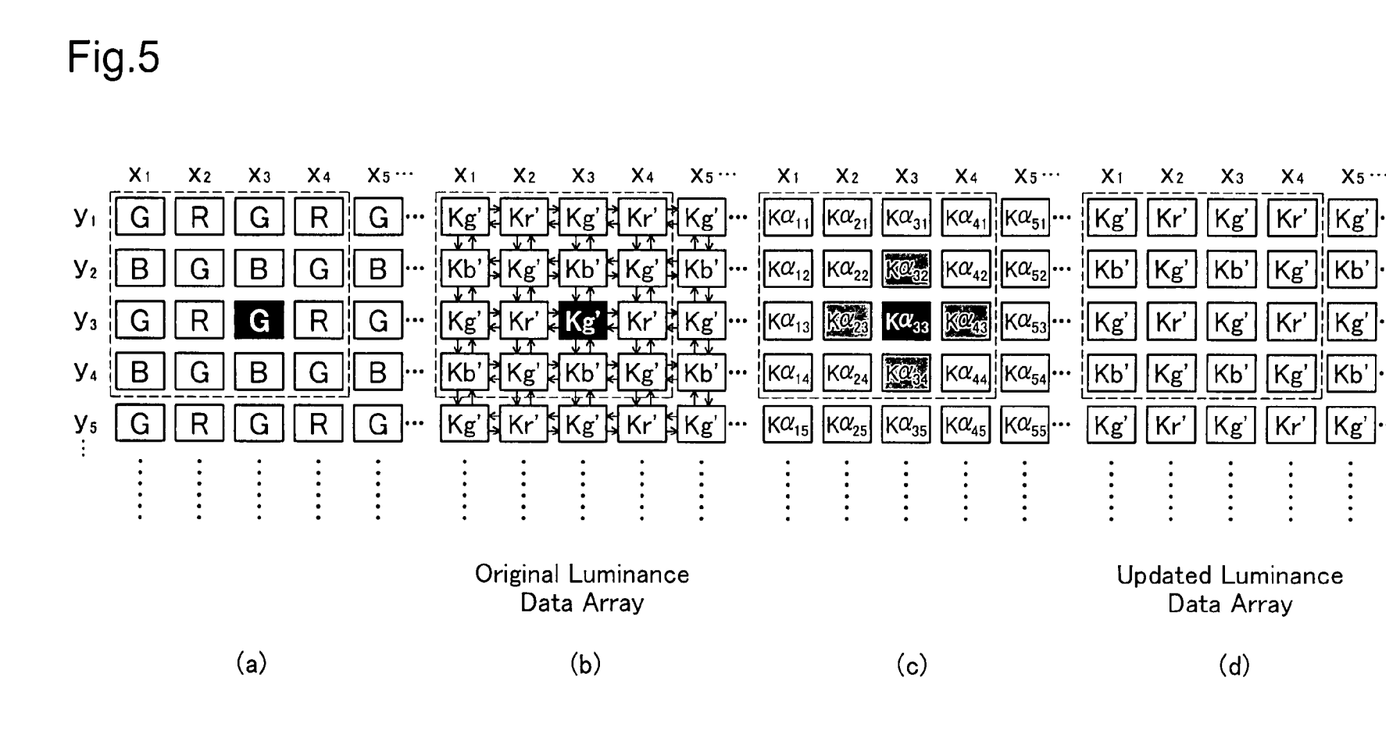
FIG. 5 shows one example of the pixel defect detection process.

The following describes the details of the pixel defect detection process executed in the above series of image processing. FIG. 4 is a flowchart showing the details of the pixel defect detection process executed at step S300 in the image processing routine of FIG. 2. FIG. 5 shows one example of the pixel defect detection process. In the illustrated example of FIG. 5, a black-filled rectangle represents a defective pixel, which has luminance data=0 and is located at a position of x3 by y3.

Subsequent to the arrangement of the luminance data (see FIG. 3(c)) at step S220 in the flowchart of FIG. 2, the personal computer 30 compares the luminance data of each target pixel with the luminance data of adjoining pixels adjacent to the target pixel (step S310) in the flowchart of FIG. 4. Luminance data Kdmn of each target pixel at a position of xm by yn (where m and n denote positive numbers of not less than 1) is compared with an average value Kdav of luminance data of four adjoining pixels on the left, right, top, and bottom of the target pixel, that is, pixels at positions of (xm−1) by yn, (xm+1) by yn, xm by (yn−1), and xm by (yn+1). The result of comparison Kαmn represents the absolute value of the difference:

$$Kdav=\{Kd(m-1)n+Kd(m+1)n+Kdm(n-1)+Kdm(n+1)\}/4$$

$$K\alpha mn=|Kdmn-Kdav|$$

For example, a pixel at a position of x2 by y2 has luminance data Kd22 =Kg' in the illustrated example of FIG. 5(b). This luminance data Kd22 =Kg' is compared with the average value Kdav of the luminance data of the four adjoining pixels (KDav=(Kb'+Kb'+Kr'+Kr')/4). The arrows in FIG. 5(b) represent the directions of such comparison. The luminance data of the defective pixel at the position of x3 by y3 is also compared with the luminance data of the four adjoining pixels. The processing of step S310 determines the result of comparison Kαmn for each target pixel. The luminance data of each pixel on the x1 column and on the y1 row is compared with the average value of the luminance data of three adjoining pixels.

The personal computer 30 maps the results of comparison Kαmn of the luminance data to the respective pixels of the specified pixel arrangement (step S320) as shown in FIG. 5(c), and ranks the respective pixels based on the results of comparison Kαmn of the luminance data (step S330). This ranking of each pixel desirably prevents any normal pixel, for example, a pixel at a position of x3 by y2, adjacent to the defective pixel at the position of x3 by y3 from being wrongly identified as a defective pixel.

The ranking process of step S330 ranks each pixel having the result of comparison Kαmn that is less than a preset first reference value α1, as KαOK pixel having a sufficiently small difference from the luminance data of adjoining pixels. The sufficiently small difference identifies the pixel as a normal pixel. Each pixel having the result of comparison Kαmn in a range of the preset first reference value α1 and a preset second reference value α2 is specified as a pixel having a greater difference from the luminance data of adjoining pixels than the KαOK pixel. This suggests a possible involvement of the luminance data of the defective pixel in this result of comparison Kαmn. The normal pixel at the position of x3 by y2 has the greater difference from the luminance data of the adjoining pixels than the KαOK pixel, since the luminance data of the defective pixel at the position of x3 by y3 is involved in the result of comparison Kα32. The pixel having the result of comparison Kαmn in the range of the preset reference values α1 and α2 is ranked as a KαOK/NG pixel. The pixel having the result of comparison Kαmn that is not less than the preset second reference value α2 is ranked as a KαNG pixel having a significantly large difference from the luminance data of adjoining pixels.

Among the results of comparison Kαmn mapped to the specified pixel arrangement at step S320, the pixels ranked as KαOK/NG and the pixel ranked as KαNG are respectively shown by gray-filled rectangles and a black-filled rectangle in the illustration of FIG. 5(c).

The personal computer 30 identifies a defective pixel, based on the results of ranking (step S340). The pixel ranked as KαNG has a significantly large difference from the luminance data of the adjoining pixels and is accordingly identified as a defective pixel. The first reference value α1 and the second reference value α2 used for the ranking are respectively set to ensure a significantly high accuracy of identification of a normal pixel and to ensure a significantly high accuracy of identification of a defective pixel.

The first and the second reference values α1 and α2 used for the ranking and the identification of a defective pixel are set on the following ground.

There are two types of defective pixels, that is, a dark pixel having a significant sensitivity drop from adjoining pixels and a bright pixel having a dark current. In this embodiment, the dark pixel represents a pixel having a 50% or greater sensitivity drop from adjoining pixels in illumination to 70% of its saturation level. The bright pixel represents a pixel having a dark current of not less than 5000 electrons per second at 25° C. The reference values α1 and α2 are set to ensure significant identification of such defective pixels.

The personal computer 30 detects the presence or the absence of any pixel defect according to the identification of defective pixel (step S350). In the absence of any pixel defect, the image processing flow goes to step S230 (in the flowchart of FIG. 2) to wait for the user's specification of the editing-related settings (retouching) and subsequent steps to retouch the image data and generate and output the retouched image data.

In the presence of any pixel defect at step S350, on the other hand, the personal computer 30 reclassifies the adjoining pixels adjacent to the identified defective pixel into defective pixels and normal pixels (step S360). The adjoining pixels adjacent to the defective pixel have relatively large differences from the luminance data of the adjoining pixels, since the luminance data of the defective pixel is involved in their results of comparison Kαmn. The image processing flow of this embodiment thus re-identifies any other defective pixels among such adjoining pixels, although the pixels ranked as KαOK/NG may unconditionally be identified as normal pixels. The KαOK/NG pixels identified as normal pixels at step S360 are set to KαOK pixels.

The processing of step S360 again compares the luminance data of each pixel ranked as Kα OK/NG at step S330 with the luminance data of adjoining pixels after exclusion of the luminance data of the defective pixel identified at step S340. In the illustrated example of FIG. 5(c), the luminance data Kd32 (=Kb') of the Kα OK/NG pixel at the position of x3 by y2 is compared with the average value Kdav of the luminance data of three adjoining pixels at positions of x2 by y2, x4 by y2, and x3 by y1 other than the luminance data Kd33 (=Kg') of the identified defective pixel at the position of x3 by y3, that is, Kdav=(Kd22+Kd42+Kd31)/3. The respective Kα OK/NG pixels are identified as normal pixels or defective pixels according to the results of comparison Kαmn. This re-identification of defective pixels desirably raises the accuracy of detection of a pixel defect.

Figure 6:
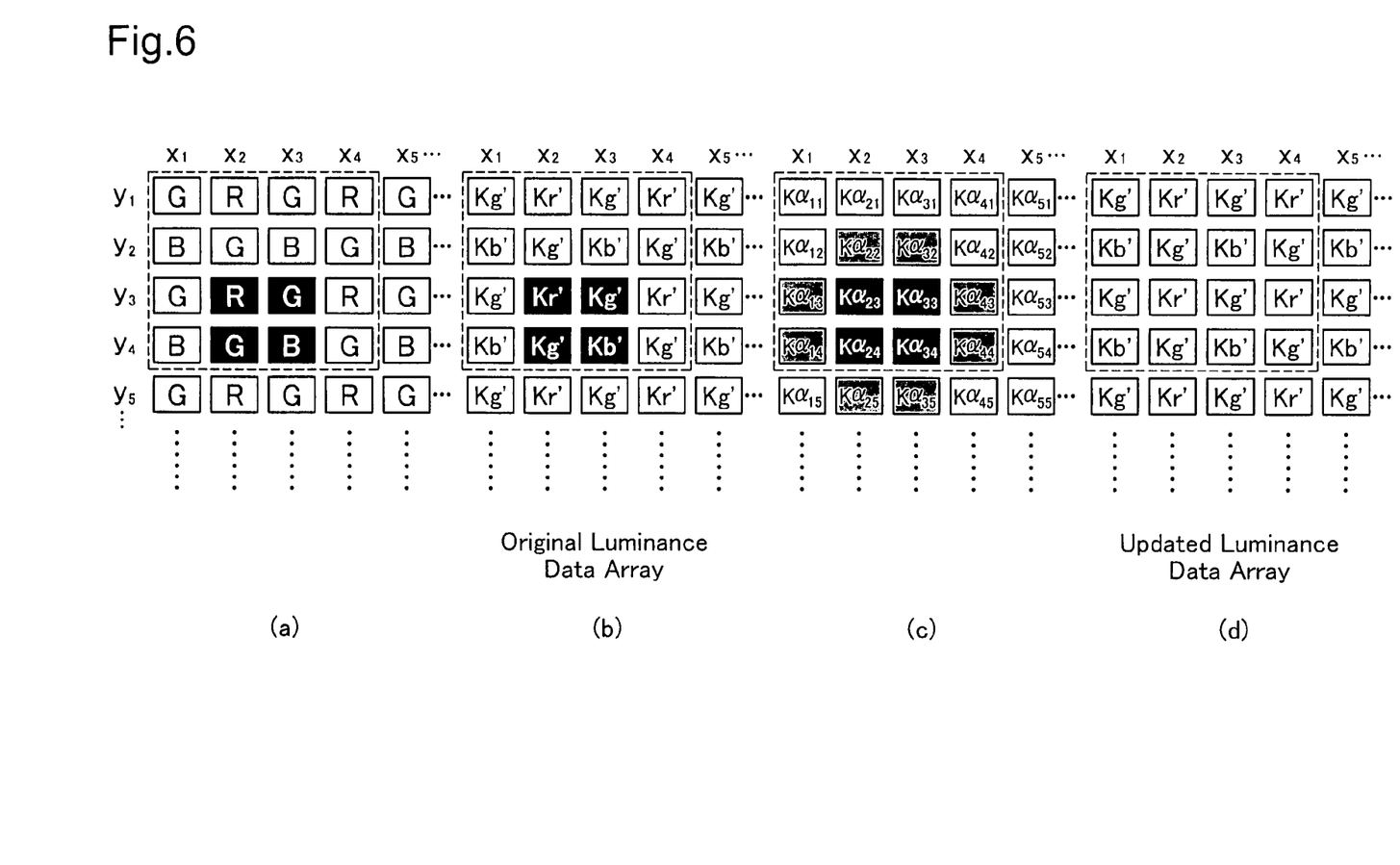
FIG. 6 shows another example of the pixel defect detection process in the case where multiple defective pixels are collectively present.

After the reclassification of the adjoining KαOK/NG pixels adjacent to the identified defective pixel, the personal computer 30 determines whether the defective pixel is isolated or multiple defective pixels are collectively present (step S370). This determination is required, because different techniques are adopted in subsequent data correction between the isolated defective pixel and the collective defective pixels. FIG. 6 shows another example of the pixel defect detection process in the case where multiple defective pixels are collectively present.

In the case of the isolated defective pixel at step S370, the luminance data of the isolated defective pixel is corrected with the luminance data of adjoining pixels (step S380). In the illustrated example of FIG. 5, the luminance data Kd33 (=Kg') of the defective pixel at the position of x3 by y3 is replaced by the average value Kdav of the luminance data Kd23 (=Kr'), Kd43 (=Kr'), Kd32 (=Kb'), and Kd34 (=Kb') of adjoining pixels at positions of x2 by y3, x4 by y3, x3 by y2, and x3 by y4:

$$Kd33=Kdav=(Kd23+Kd43+Kd32+Kd34)/4$$

In the case of the collective defective pixels at step S370 as in the example of FIG. 6, on the other hand, the personal computer 30 sequentially corrects the luminance data of the collective defective pixels as discussed below (step S390). The correction process first replaces luminance data Kd23 (=Kr') of a defective pixel at a position of x2 by y3 among the collective defective pixels by the average value Kdav of luminance data Kd13 (=Kg') and Kd22 (=Kg') of normal pixels at positions of x1 by y3 and x2 by y2 on the left and the top of the x2-y3 defective pixel:

$$Kd23=Kdav=(Kd13+Kd22)/2$$

The correction process then replaces luminance data Kd33 (=Kg') of a defective pixel at a position of x3 by y3 by the average value Kdav of luminance data Kd32 (=Kb') and Kd43 (=Kr') of normal pixels at positions of x3 by y2 and x4 by y3 on the top and the right of the x3-y3 defective pixel and the corrected luminance data Kd23 (=Kr') of the defective pixel at the position of x2 by y3 on the left of the x3-y3 defective pixel:

$$Kd33=Kdav=(Kd23+Kd32+Kd43)/3$$

The correction process then replaces luminance data Kd24 (=Kg') of a defective pixel at a position of x2 by y4 by the average value Kdav of luminance data Kdl4 (=Kb') and Kd25 (=Kr') of normal pixels at positions of x1 by y4 and x2 by y5 on the left and the bottom of the x2-y4 defective pixel and the corrected luminance data Kd23 (=Kr') of the defective pixel at the position of x2 by y3 on the top of the x2-y4 defective pixel:

$$Kd24=Kdav=(Kd14+Kd23+Kd25)/3$$

The correction process subsequently replaces luminance data Kd34 (=Kb') of a defective pixel at a position of x3 by y4 by the average value Kdav of luminance data Kd44 (=Kg') and Kd35 (=Kg') of normal pixels at positions of x4 by y4 and x3 by y5 on the right and the bottom of the x3-y4 defective pixel and the corrected luminance data Kd24 (=Kg') and Kd33 (=Kg') of the defective pixels at the positions of x2 by y4 and x3 by y3 on the left and the top of the x3-y4 defective pixel:

$$Kd34=Kdav=(Kd24+Kd33+Kd44+Kd35)/4$$

The correction process sequentially corrects the luminance data of each defective pixel from the left corner of the collective defective pixels with the luminance data of adjoining normal pixels and uses the corrected luminance data for subsequent data correction of the adjacent defective pixels.

On completion of the correction of the luminance data of the isolated defective pixel at step S380 or completion of the sequential correction of the luminance data of the collective defective pixels at step S390, the personal computer 30 updates the luminance data arranged at step S220 to the corrected luminance data (step S400) and goes to step S230 (in the flowchart of FIG. 2) to wait for the user's specification of the editing-related settings (retouching). Even when there is a pixel defect in an input image, the procedure of this embodiment corrects the luminance data of each defective pixel and generates and outputs retouched image data based on the corrected luminance data.

As described above, when there is any pixel defect in input image data (unprocessed raw data) from the digital still camera 22, the procedure of this embodiment corrects the luminance data of each defective pixel with the luminance data of adjoining normal pixels and uses the processed image data including the corrected luminance data for the subsequent image editing process. The image data is edited after elimination or at least reduction of the adverse effects of the defective pixels. The resulting edited image accordingly has the improved picture quality and relieves the user's impression of strangeness due to a significant change of the luminance.

The pixel defect detection process of this embodiment identifies a defective pixel, based on the computed results of comparison K a mn between the luminance data of each target pixel and the average value of the luminance data of four adjoining pixels on the top, bottom, left, and right of the target pixel. The process then re-identifies other defective pixels among adjoining pixels adjacent to the identified defective pixel, based on the recomputed results of comparison Kαmn. The process replaces the luminance data of each identified defective pixel with the average value of the luminance data of adjoining normal pixels (step S380 or S390) and updates the luminance data of the defective pixels to the corrected luminance data. The correction of the luminance data of the defective pixels with the luminance data of the adjoining normal pixels desirably relieves the user's impression of strangeness due to a significant luminance change around the defective pixels. The comparison of the luminance data is made after elimination or at least reduction of the effects of the color filters. This ensures the accurate detection of a pixel defect and the reliable correction of the detected pixel defect.

The embodiment discussed above is to be considered in all aspects as illustrative and not restrictive. There may be many modifications, changes, and alterations without departing from the scope or spirit of the main characteristics of the present invention. Some examples of possible modification are given below.

The pixel defect with abnormal luminance data as shown in FIG. 5 or FIG. 6 is reproducible in images taken by the same hardware structure, for example, the digital still camera 22. One modified processing flow maps the image data input at step S200 (see FIG. 2) to the hardware structure (for example, the digital still camera 22) and stores the position of each identified defective pixel (for example, the position of x3 by y3 of the defective pixel) in the pixel array specified at step S210. When another image taken by the same hardware structure is input, the modified processing flow may omit the identification of the stored defective pixel (for example, the x3-y3 defective pixel) and directly correct the luminance data of the defective pixel (step S380 or S390) and update the luminance data (step S400). This simplifies the processing flow. Another possible modification may carry out the identification of a defective pixel with regard to only the stored defective pixel (for example, the x3-y3 defective pixel). When the same results are obtained, the modified processing flow corrects the luminance data of the defective pixel (step S380 or S390) and updates the luminance data (step S400). Fixation or replacement of the defective CCD camera in the hardware structure eliminates the existing pixel defect. This modified procedure effectively handles this case to identify the stored defective pixel as a normal pixel after elimination of the existing pixel defect and omit the subsequent correction and update steps.

The pixel defect detection process of the above embodiment compares the luminance data of each target pixel with the average value of the luminance data of four adjoining pixels on the top, bottom, left, and right of the target pixel. The luminance data of each target pixel may otherwise be compared with the average value of the luminance data of eight adjoining pixels in the oblique directions as well as on the top, bottom, left, and right of the target pixel.

Having described a preferred embodiment of the invention with reference to the accompanying drawings, it is to be understood that the invention is not limited to the embodiments, and that various changes and modifications could be effected therein by one skilled in the art without departing from the spirit or scope of the invention as defined in the appended claims.

What is claimed is:

1. An image processing device that receives input of image data representing an image taken by an imaging unit and processes the input image data, said image processing device comprising:

an image data input module that receives the input image data as unprocessed raw data realized as a set of pixel data, which include luminance data representing luminance values of respective pixels constituting the imaging unit;

a mapping module that maps the input image data to an array of the respective pixels constituting the imaging unit;

a pixel defect detection module that compares the luminance data of each target pixel as an object of detection with the luminance data of at least one adjoining pixel adjacent to the target pixel and detects a pixel defect according to a result of the comparison, and when the target pixel is determined to be defective, said pixel defect detection module also determines a state of being of the defective pixel;

a pixel defect connection and update module that corrects the luminance data of an identified defective pixel, which is detected as the pixel defect by said pixel defect detection module, with the luminance data of at least one adjoining pixel adjacent to the identified defective pixel, in different manners depending upon the state of being of the defective pixel, and updates, in the different manners, the luminance data of the pixel data allocated to the defective pixel by said mapping module to the connected luminance data; and a defective pixel position storage module that relates a position of the identified defective pixel to the imaging unit that has the defective pixel and stores the position in the array of the pixels constituting the imaging unit, wherein said pixel defect correction and update module, in response to further input of another image data from the imaging unit that has the defective pixel after storage of the position of the defective pixel in said defective pixel position storage module, automatically corrects the luminance data of a certain pixel at the stored position of the defective pixel with the luminance data of at least one adjoining pixel adjacent to the certain pixel and updates the luminance data of the certain pixel to the connected luminance data, wherein said pixel defect detection module determines whether the defective pixel is isolated or whether multiple defective pixels are collectively present, and wherein said pixel defect correction and update module corrects the luminance data of an identified defective pixel with the luminance data of at least one decent adjoining pixel adjacent to the identified defective pixel when the defective pixel is isolated, and corrects the luminance data of the identified defective pixel with the luminance data of the at least one adjoining decent pixel adjacent to the identified defective pixel and the luminance data of at least one adjoining defective pixel adjacent to the identified defective pixel only when the luminance data of the at least one adjoining defective pixel has been connected, when multiple defective pixels are collectively present.

2. An image processing device in accordance with claim 1, wherein said pixel defect detection module computes a difference between the luminance data of each target pixel and an average value of the luminance data of multiple adjoining pixels adjacent to the target pixel and identifies the target pixel as a defective pixel when the difference exceeds a preset reference value, and said pixel defect connection and update module replaces the luminance data of the identified defective pixel with the average value of the luminance data of the adjoining pixels when the defective pixel is isolated, replaces the luminance data of the identified defective pixel with the average value of the luminance data of the at least one adjoining decent pixel adjacent to the identified defective pixel and the corrected luminance data of the at least one adjoining defective pixel adjacent to the identified defective pixel when multiple defective pixels are collectively present, and updates the luminance data allocated to the defective pixel by said mapping module to the replaced average value of the luminance data.

3. An image processing device in accordance with claim 1, wherein said pixel defect detection module compares the luminance data by taking into account effects of transmission factors of filters allocated to the respective pixels constituting the imaging unit.

4. An image processing device in accordance with claim 1, said image processing device further comprising:

an editing module that edits the image data including the updated luminance data of the identified defective pixel and generates edited image data; and an edited image output module that outputs the edited image data.

5. An image data processing method that receives input of image data representing an image taken by an imaging unit and processes the input image data, said image data processing method comprising the steps of:

(a) receiving the image data as unprocessed raw data and as a set of pixel data, which include luminance data representing luminance values of respective pixels constituting the imaging unit;

(b) mapping the input image data to an array of the respective pixels constituting the imaging unit;

(c) comparing the luminance data of each target pixel as an object of detection with the luminance data of at least one adjoining pixel adjacent to the target pixel and detecting a pixel defect according to a result of the comparison, and when the target pixel is determined to be defective, determining a state of being of the defective pixel;

(d) correcting the luminance data of an identified defective pixel, which is detected as the pixel defect in said step (c), with the luminance data of at least one adjoining pixel adjacent to the identified defective pixel, in different manners depending upon a state of being of the defective pixel, and updating, in the different manners, the luminance data of the pixel data allocated to the defective pixel in said step (b) to the connected luminance data;

(e) relating a position of the identified defective pixel to the imaging unit that has the defective pixel and storing the position in the array of the pixels constituting the imaging unit;

(f) editing the image data including the updated luminance data of the identified defective pixel and generating edited image data; and (g) outputting the edited image data, wherein the correcting and updating of the luminance data in said step (d), in response to further input of another image data from the imaging unit that has the defective pixel after storage of the position of the defective pixel in said step (e), automatically corrects the luminance data of a certain pixel at the stored position of the defective pixel with the luminance data of at least one adjoining pixel adjacent to the certain pixel and updates the luminance data of the certain pixel to the corrected luminance data, wherein the determining a state of being of the defective pixel in said step (c) determines whether the defective pixel is isolated or whether multiple defective pixels are collectively present, and wherein said correcting and updating of the luminance data in said step (d) connects the luminance data of an identified defective pixel with the luminance data of at least one decent adjoining pixel adjacent to the identified defective pixel when the defective pixel is isolated, and corrects the luminance data of the identified defective pixel with the luminance data of the at least one adjoining decent pixel adjacent to the identified defective pixel and the luminance data of at least one adjoining defective pixel adjacent to the identified defective pixel only when the luminance data of the at least one adjoining defective pixel has been corrected, when multiple defective pixels are collectively present.

6. A computer program product that causes a computer to execute image data processing that receives input of image data representing an image taken by an imaging unit and processes the input image data, said computer program product comprising:

a computer recording medium; and a computer program stored in said computer recording medium, said computer program comprising:

a first program of receiving the image data as unprocessed raw data and as a set of pixel data, which include luminance data representing luminance values of respective pixels constituting the imaging unit;

a second program of mapping the input image data to an array of the respective pixels constituting the imaging unit;

a third program of comparing the luminance data of each target pixel as an object of detection with the luminance data of at least one adjoining pixel adjacent to the target pixel and detecting a pixel defect according to a result of the comparison, and when the target pixel is determined to be defective, determining a state of being of the defective pixel;

a fourth program of correcting the luminance data of an identified defective pixel, which is detected as the pixel defect by said third program, with the luminance data of at least one adjoining pixel adjacent to the identified defective pixel, in different manners depending upon a state of being of the defective pixel, and updating, in the different manners, the luminance data of the pixel data allocated to the defective pixel by said second program to the corrected luminance data;

a fifth program of relating a position of the identified defective pixel to the imaging unit that has the defective pixel and storing the position in the array of the pixels constituting the imaging unit;

a sixth program of editing the image data including the updated luminance data of the identified defective pixel and generating edited image data; and a seventh program of outputting the edited image data, wherein the correcting and updating of the luminance data in said fourth program, in response to further input of another image data from the imaging unit that has the defective pixel after storage of the position of the defective pixel in said fifth program, automatically corrects the luminance data of a certain pixel at the stored position of the defective pixel with the luminance data of at least one adjoining pixel adjacent to the certain pixel and updates the luminance data of the certain pixel to the corrected luminance data, wherein the determining a state of being of the defective pixel in said third program determines whether the defective pixel is isolated or whether multiple defective pixels are collectively present, and wherein said correcting and updating of the luminance data in said fourth program corrects the luminance data of an identified defective pixel with the luminance data of at least one decent adjoining pixel adjacent to the identified defective pixel when the defective pixel is isolated, and corrects the luminance data of the identified defective pixel with the luminance data of the at least one adjoining decent pixel adjacent to the identified defective pixel and the luminance data of at least one adjoining defective pixel adjacent to the identified defective pixel only when the luminance data of the at least one adjoining defective pixel has been corrected, when multiple defective pixels are collectively present.

* * * * *